US011856383B2

(12) United States Patent
Schepens

(10) Patent No.: US 11,856,383 B2
(45) Date of Patent: Dec. 26, 2023

(54) LOUDSPEAKER SYSTEM

(71) Applicant: PSS BELGIUM NV, Dendermonde (BE)

(72) Inventor: Johan Schepens, Dendermonde (BE)

(73) Assignee: PSS BELGIUM NV, Dendermonde (BE)

( * ) Notice: Subject to any disclaimer, the term of this patent is extended or adjusted under 35 U.S.C. 154(b) by 307 days.

(21) Appl. No.: 17/432,234

(22) PCT Filed: Jan. 20, 2020

(86) PCT No.: PCT/EP2020/051297
§ 371 (c)(1),
(2) Date: Aug. 19, 2021

(87) PCT Pub. No.: WO2020/169288
PCT Pub. Date: Aug. 27, 2020

(65) Prior Publication Data
US 2022/0191620 A1 Jun. 16, 2022

(30) Foreign Application Priority Data
Feb. 21, 2019 (GB) ..................................... 1902360

(51) Int. Cl.
*H04B 1/00* (2006.01)
*H04R 9/06* (2006.01)
(Continued)

(52) U.S. Cl.
CPC ................. *H04R 9/06* (2013.01); *B60Q 9/00* (2013.01); *H04R 1/025* (2013.01); *H04R 7/12* (2013.01);
(Continued)

(58) Field of Classification Search
CPC . H04R 9/06; H04R 1/025; H04R 7/12; H04R 7/18; H04R 9/025; B60Q 9/00
See application file for complete search history.

(56) References Cited

U.S. PATENT DOCUMENTS 2,834,423 A  5/1958  Bradford
4,485,275 A  11/1984  Lahti
(Continued)

FOREIGN PATENT DOCUMENTS

DE  4434719 A1  4/1995
DE  19649140 A1  6/1997
(Continued)

OTHER PUBLICATIONS

ISA/EPO, International Search Report and Written Opinion for corresponding PCT Patent Application No. PCT/EP2020/051297, dated Jul. 2, 2020, 18 pages.

*Primary Examiner* — Simon King
(74) *Attorney, Agent, or Firm* — NK Patent Law

(57) ABSTRACT

A loudspeaker system comprising: a loudspeaker assembly including a diaphragm, a magnet assembly, and a voice coil assembly, wherein the magnet assembly and voice coil assembly are drivably coupled to the diaphragm to displace the diaphragm to transmit pressure waves as audible sound, an enclosure arranged to enclose the loudspeaker assembly and including a back face and a front face, wherein said back face extends over the magnet assembly, and the magnet assembly is mechanically coupled to the back face and/or side face of the enclosure and the diaphragm is coupled to a front face of the enclosure, wherein the magnet assembly and diaphragm are directly connected to each other by a collapsible basket or said loud speaker assembly does not comprise a basket coupling the magnet assembly and diaphragm.

24 Claims, 8 Drawing Sheets

(51) Int. Cl.
  *B60Q 9/00* (2006.01)
  *H04R 1/02* (2006.01)
  *H04R 7/12* (2006.01)
  *H04R 7/18* (2006.01)
  *H04R 9/02* (2006.01)
  *H04R 31/00* (2006.01)

(52) U.S. Cl.
  CPC ............... *H04R 7/18* (2013.01); *H04R 9/025* (2013.01); *H04R 31/006* (2013.01); *H04R 2400/11* (2013.01); *H04R 2499/13* (2013.01)

(56) References Cited

U.S. PATENT DOCUMENTS

| | | | |
|---|---|---|---|
| 5,532,437 A | 7/1996 | Simplicean et al. | |
| 11,202,143 B2* | 12/2021 | Sato | H04R 1/2888 |
| 11,323,791 B2* | 5/2022 | Sato | H04R 1/08 |
| 2004/0208336 A1 | 10/2004 | Hamada | |
| 2008/0150324 A1 | 6/2008 | Jayasuriya et al. | |
| 2013/0126263 A1 | 5/2013 | Ito et al. | |
| 2017/0195783 A1* | 7/2017 | Gladwin | G10K 11/30 |
| 2017/0359639 A1* | 12/2017 | Timo | H04R 7/18 |
| 2018/0063610 A1* | 3/2018 | Tanabe | B60R 11/0217 |

FOREIGN PATENT DOCUMENTS

| | | |
|---|---|---|
| EP | 0510345 A2 | 10/1992 |
| EP | 0939577 A2 | 9/1999 |
| EP | 1515583 A1 | 3/2005 |
| FR | 2944753 A1 | 10/2010 |
| GB | 1346083 A | 2/1974 |
| GB | 2165419 A | 4/1986 |
| JP | 2001352591 A | 12/2001 |
| JP | 2002281598 A | 9/2002 |
| WO | 2004064448 A1 | 7/2004 |
| WO | 2007092420 A2 | 8/2007 |
| WO | 2019004246 A1 | 1/2019 |

* cited by examiner

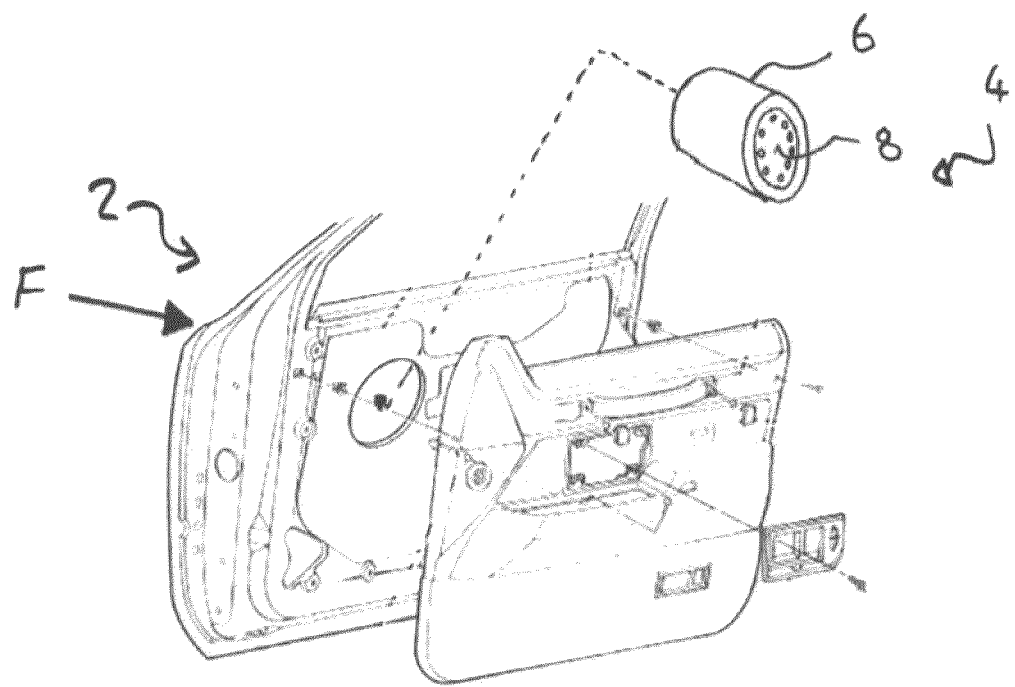
Figure 1
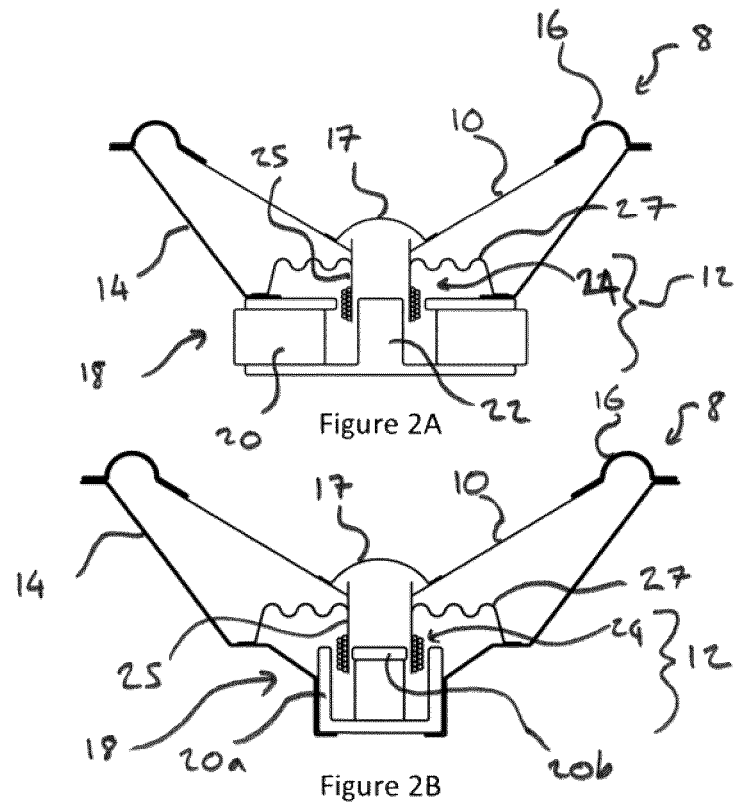
Figure 2A
Figure 2B

LOUDSPEAKER SYSTEM

CROSS REFERENCE TO RELATED APPLICATIONS

This application is a U.S. National Stage Application of International Patent Application No. PCT/EP2020/051297 entitled "LOUDSPEAKER SYSTEM" filed on Jan. 20, 2020, which claims priority from GB1902360.5 entitled "LOUDSPEAKER SYSTEM" filed on Feb. 21, 2019, the entire contents of which are herein incorporated by reference for all purposes.

FIELD

The present disclosure relates to the field of loudspeaker systems. In particular, the disclosure relates to loudspeakers and loudspeaker assemblies comprising a loudspeaker enclosure and a loudspeaker, which are for use in the automotive industry.

BACKGROUND

A loudspeaker comprises, inter alia, a diaphragm, which is displaceable to transmit pressure waves as audible sound. The diaphragm is drivably coupled to a magnet and voice coil assembly, which is operable to convert electrical energy to axial displacement to provide said driving of the diaphragm. A basket interconnects the diaphragm and magnet and voice coil assembly proving a rigid frame to convey said drive. The basket is also connectable to an enclosure for mounting of the loudspeaker.

In conventional loudspeakers, the basket is designed to be highly rigid for the purpose of conveying with high accuracy said axial displacement to the diaphragm. In the automotive industry, such loudspeakers are mounted within a dedicated loudspeaker enclosure, which is typically arranged within a door or under carriage of the vehicle. The enclosure may also be configured in various ways to reduce noise leakage outside the vehicle. The loudspeaker may be arranged with the diaphragm facing a passenger of the vehicle for optimal transmission of audio information thereto.

A drawback with this implementation is that in the event of impact to the door or undercarriage, the loudspeaker can project into the passenger causing harm.

Therefore, in spite of the effort already invested in the development of loudspeakers and their enclosures further improvements are desirable.

EP0510345A1 discloses a loudspeaker for use in a vehicle.

WO2004/064448A1 discloses a loudspeaker for use in a vehicle.

DE19649140A1 discloses a loudspeaker for use in a vehicle.

FR2944753A1 discloses a loudspeaker for use in a vehicle.

GB2165419, US2004/0208336, US2013/0126263 disclose loudspeakers.

SUMMARY

The present disclosure provides a loudspeaker system comprising: a loudspeaker assembly including a diaphragm, a magnet assembly and a voice coil assembly, wherein the magnet assembly and voice coil assembly are drivably coupled to the diaphragm to displace the diaphragm to transmit pressure waves as audible sound, and an enclosure arranged to enclose the loudspeaker assembly, the enclosure including a back face and a front face, which is arranged opposing said back face.

In embodiments, the back face extends over the magnet assembly, and the magnet assembly is mechanically coupled (e.g. via a direct connection) to the back face and/or side face of the enclosure. In embodiments, the diaphragm is coupled (e.g. via a direct or indirect connection) to a front face of the enclosure, wherein the magnet and voice coil assembly and diaphragm are directly connected to each other by a collapsible basket or said loud speaker assembly does not comprise a basket.

By connecting the magnet assembly to the back face and/or side face of the enclosure load can be conveyed directly from the enclosure to the loud speaker system to enable a controlled and directed failure mechanism, e.g. such that the basket collapses in a particular manner, and/or (particularly in embodiments without a basket) such that said components of the speaker are brought together in a particular manner and remain connected to the enclosure. By implementing a collapsible basket, or no basket, the loudspeaker assembly can be configured to collapse with the enclosure and without projecting beyond the collapsed enclosure.

The mechanical coupling between the magnet assembly and the back face and/or side face of the enclosure may provide a rigid attachment between the magnet assembly and the enclosure, preferably such that the magnet assembly remains attached to (and/or retained within) the enclosure in the event of a load being applied to the loudspeaker system which causes the loudspeaker system to collapse. The load which causes the loudspeaker system to collapse may be a predetermined load. The load which causes the loudspeaker system to collapse may correspond to (e.g. be equal to) the failure load of the loudspeaker system.

In this context, a rigid attachment between the magnet assembly and the enclosure is intended to mean that the magnet assembly is held rigidly in place with respect to the loudspeaker enclosure, noting that this attachment can be achieved directly or indirectly as described in the following paragraphs. The term "provide a rigid attachment between the magnet assembly and the enclosure" may be used interchangeable "hold the magnet assembly rigidly in place with respect to the enclosure".

In a conventional loudspeaker system mounted in (e.g. a door of) a vehicle, there is no rigid attachment between the magnet assembly and the enclosure, and as such, in the event of a sudden impact (e.g. caused by the vehicle crashing), the magnet assembly (which is often the heaviest component of a loudspeaker assembly) can be launched as a projectile out from the enclosure. The present inventors have observed this is a potential hazard for the passengers within the vehicle.

Advantageously, by providing a rigid attachment between the magnet assembly and the enclosure as described above, the magnet assembly can be prevented from being projected out from the enclosure, in the event of a sudden impact (e.g. caused by the vehicle crashing), thereby improving safety.

Although the concept of rigidly attaching a magnet assembly to a loudspeaker enclosure does appear to have been considered in the prior art, see e.g. GB2165419, US2004/0208336, US2013/0126263, the prior art only appears to envisage doing so for the purpose of reducing vibrations. The prior does not appear to have considered rigidly attaching a magnet assembly to a loudspeaker enclosure in combination with collapsible loudspeaker system to prevent the magnet assembly from being projected out from the enclosure in the event of a sudden impact, as considered by this disclosure.

The mechanical coupling between the magnet assembly and the back face and/or side face of the enclosure (e.g. which preferably provides a rigid attachment between the magnet assembly and the enclosure—see above) may be provided by one or more physical connectors, wherein the/each physical connector engages with both the magnet assembly and the enclosure. The/each physical connector could, for example, be a bolt, screw, rod or pin (e.g. a screw which threadably engages with a hole in the magnet assembly and a corresponding hole in the back face and/or side face of the enclosure). The one or more physical connectors described in this paragraph can be viewed as providing a direct connection or direct attachment between the magnet assembly and the enclosure.

The mechanical coupling between the magnet assembly and the back face and/or side face of the enclosure (e.g. which preferably provides a rigid attachment between the magnet assembly and the enclosure—see above) may be provided by glue. Again, this glue can be viewed as providing a direct connection or direct attachment between the magnet assembly and the enclosure.

However, the mechanical coupling between the magnet assembly and the back face and/or side face of the enclosure (e.g. which preferably provides a rigid attachment between the magnet assembly and the enclosure—see above) may be provided without requiring direct attachment between the magnet assembly and the enclosure.

For example, the mechanical coupling between the magnet assembly and the back face and/or side face of the enclosure (e.g. which preferably provides a rigid attachment between the magnet assembly and the enclosure—see above) may be provided (indirectly) by a physical element (e.g. flange) configured to retain the magnet assembly in position with respect to the back face and/or side face of the enclosure (e.g. by overlapping the magnet assembly in a direction which is transverse to a direction in which the magnet and voice coil assemblies are configured to move the diaphragm) wherein the flange is rigidly coupled to (e.g. the back face and/or side face of) the enclosure. The flange may be rigidly coupled to the enclosure directly, or indirectly via one or more intermediate components (e.g. mounting members as discussed below).

In some embodiments, the front face of the enclosure comprises an aperture corresponding to the diaphragm for transmission of the audible sound to a user. The diaphragm may be connected (e.g. directly or indirectly) around a periphery of said aperture.

In some embodiments, wherein when subject to a compressive force between the back and front face, the loudspeaker system is configured to collapse at substantially the failure load of the enclosure, wherein said collapsing includes reduction in a distance between the magnet assembly and diaphragm of the loud speaker assembly.

By configuring the loudspeaker system to collapse at substantially the failure load of the enclosure, e.g. a failure load of faces interconnecting the back and front faces and/or said back and/or front faces, the loudspeaker assembly may be fully collapsed within the enclosure, which may be safer for a proximal user.

In some embodiments, the loudspeaker system is configured to collapse between a range extending from the failure load of the enclosure to less than 30% or 20% more than the failure load of the enclosure.

In some embodiments, when subject to a compressive force between the back and front face, the loudspeaker system is configured to collapse at a threshold load which is selected to be less than 5000 N or 3000 N or 2000 N or 1000 N and greater than 500 N. By configuring the loudspeaker system to collapse at said ranges, it has been found that collapsing can occur when subject to impact in a safe manner, whilst maintaining sufficient rigidity for the desired audio performance.

In some embodiments wherein the loudspeaker assembly comprises a collapsible basket, the collapsible basket may be configured to collapse at less than the failure load of the enclosure, e.g. at less than 30% or 20% of the failure load of the enclosure. By configuring the loudspeaker assembly to collapse at less than the failure load of the enclosure, it can be ensured that the failure load of the enclosure substantially controls a failure load of the loudspeaker system.

In some embodiments, the collapsible basket is configured to collapse at less than 500 N. In embodiments, the collapsible basket is configured to collapse at greater than 100 N. By configuring the basket to collapse at said ranges, it has been found that collapsing can occur when subject to impact in a safe manner (e.g. without substantially effecting the failure load of the enclosure) whist maintain sufficient rigidity for the desired audio performance.

In some embodiments wherein the loudspeaker assembly comprises a basket, the basket may include a plurality of axially extending members interconnecting a diaphragm support and a magnet and voice coil support, said members removably attached to the diaphragm support and the magnet and voice coil support. By implementing said removable members, the basket can be implemented to ensure the correct positioning of the magnet assembly, voice coil assembly and diaphragm, when arranging and connecting the loudspeaker assembly to/in the enclosure. The removable members may subsequently be removed once said connection has taken place.

In some embodiments wherein the loudspeaker assembly comprises a basket, the basket may include a plurality of axially extending members interconnecting a diaphragm support and a magnet assembly support, said members comprising a weakening section configured to collapse under a compressive load applied between the diaphragm support and a magnet assembly support. By implementing a weakening section, the basket can be configured to collapse at a particular point in a controlled manner when subject to said load.

In some embodiments, wherein the enclosure comprises a walled structure interconnecting the back face and front face. By implementing a walled structure the enclosure can be configured to collapse with a consistent failure mode and at a specific threshold load.

Preferably, the enclosure is configured to be mounted in (e.g. a door or an under carriage of) a motorized passenger vehicle.

Disclosed herein is a motorized passenger vehicle comprising the loudspeaker system of any preceding embodiment, or another embodiment disclosed herein. In embodiments, the loudspeaker system is arranged in a door and/or under carriage of said vehicle.

Disclosed herein is use of any preceding embodiment, or another embodiment disclosed herein, for a motorized passenger vehicle.

Disclosed herein is a method of assembling a loudspeaker system, the method comprising: arranging a diaphragm, a magnet assembly and a voice coil assembly within a loudspeaker enclosure; connecting the diaphragm to a front face of the enclosure; connecting the magnet assembly to a back and/or side face of the enclosure, wherein the magnet assembly and voice coil assembly and diaphragm are directly connected to each other by a collapsible basket or said loud speaker assembly does not comprise a basket. The method may implement any feature of any preceding embodiment, or another embodiment disclosed herein.

In some embodiments, when a loudspeaker assembly implements a basket and said basket includes removable members to interconnect the diaphragm and magnet assembly, the method comprising, subsequent to connecting of the loudspeaker assembly to the enclosure (e.g. connecting the diaphragm to a front face of the enclosure; connecting the magnet assembly to a back and/or side face of the enclosure) removing the removable members.

The preceding summary is provided for purposes of summarizing some embodiments to provide a basic understanding of aspects of the subject matter described herein. Accordingly, the above-described features are merely examples and should not be construed to narrow the scope or spirit of the subject matter described herein in any way. Moreover, the above and/or proceeding embodiments may be combined in any suitable combination to provide further embodiments. Other features, aspects, and advantages of the subject matter described herein will become apparent from the following Detailed Description, Figures, and Claims.

SUMMARY OF THE FIGURES

Aspects, features and advantages of embodiments of the present disclosure will become apparent from the following description of embodiments in reference to the appended drawings in which like numerals denote like elements.

FIG. 1 is an illustrative view showing an embodiment loudspeaker system arranged in a vehicle door.

FIGS. 2A and 2B are a side cross-sectional schematic view showing a loudspeaker assemblies of the embodiment loudspeaker system of FIG. 1.

DETAILED DESCRIPTION OF THE INVENTION

Figure 3:
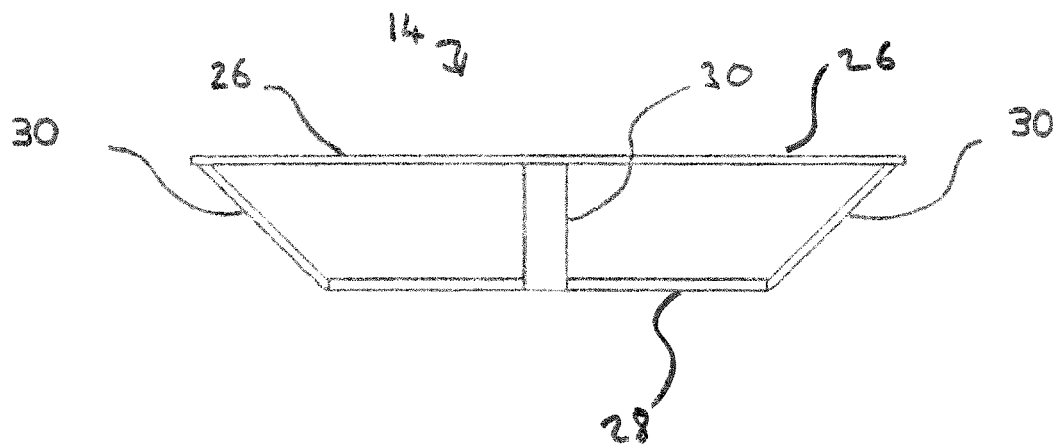
FIG. 3 is a side cross-sectional view showing an embodiment basket of the loudspeaker of the loudspeaker system of FIG. 2A or 2B.

Before describing several embodiments of a loudspeaker system, it is to be understood that the system is not limited to the details of construction or process steps set forth in the following description. It will be apparent to those skilled in the art having the benefit of the present disclosure that the system is capable of other embodiments and of being practiced or being carried out in various ways.

The present disclosure may be better understood in view of the following explanations:

As used herein the term "vehicle" may refer to a device used for transporting people or goods, especially on land, such as a car, lorry, or van. The vehicle may be motorised.

As used herein the term "vehicle door" may refer to a type of door, typically hinged, but sometimes attached by other mechanisms such as tracks, in front of an opening which is used for entering and exiting the vehicle. A vehicle door can be opened to provide access to the opening, or closed to secure it. The doors can be opened manually, or powered electronically.

As used herein the term "loudspeaker" or "loudspeaker assembly" (these terms may be used interchangeably) may refer to an electroacoustic transducer, which converts an electrical audio signal into a corresponding sound by pushing on the air to create sound waves. The loudspeaker includes an assembly of components including a diaphragm, voice coil assembly, magnet assembly.

As used herein the term "loudspeaker enclosure" or "enclosure" or "cabinet" (these terms may be used interchangeably) may refer a unit in which the loudspeaker as defined herein, and optionally associated electronic hardware, such as crossover circuits and, in some cases, power amplifiers, are mounted. The enclosure may include internal baffles, horns, bass reflex ports and acoustic insulation. The enclosure may be formed from any suitable material, including composite materials, plastics, wood. The enclosure may be implemented to prevent sound waves generated by the rearward-facing surface of a diaphragm of the loudspeaker interacting with sound waves generated at the front of the speaker driver. The enclosure may be implemented to reduce noise leakage outside the vehicle, which may cause irritation to people outside the vehicle or for privacy of the passenger. The enclosure may be any suitable dimension for housing the loud speaker, e.g. square, rectangular or cylindrical. A loudspeaker enclosure would typically enclose a defined volume, which volume may typically be 3 litres or more, or in some cases 4 litres or more. A loudspeaker enclosure would typically substantially enclose the defined volume, e.g. to provide a desired acoustic effect. For avoidance of any doubt, it is possible for a loudspeaker enclosure to include one or more apertures, e.g. to provide a desired acoustic effect, whilst still substantially enclosing the defined volume. In this way, a loudspeaker enclosure can be understood as something very different to a basket typically used to interconnect the diaphragm and magnet in a loudspeaker, since a typical basket has an open structure that does not substantially enclose a defined volume and is not configured to provide a desired acoustic effect. Moreover, to the extent that the open structure of a typical basket could be viewed as "containing" a volume, the volume "contained" by a typical basket is much smaller than 3 litres (and might typically be around 0.5 litres).

As used herein the term "collapsible" or "collapse" or "collapsible member" may refer a member or unit that is arranged to collapse under a particular load. The collapsing can be elastic (i.e. reversible), plastic or a combination thereof. The collapsing can include folding, breakage, buckling of a combination thereof.

Referring to FIG. 1, a vehicle door 2 of a motorised passenger vehicle (not shown) includes a loudspeaker 4. The loudspeaker system 4 includes a loudspeaker enclosure 6 and a loudspeaker 8 arranged within said enclosure 6. It will be understood from the figure that a side impact to the vehicle door along line may cause an axial force F to be transmitted through the loudspeaker system 4. Said axial force can cause collapsing of the enclosure 6 and the loudspeaker 8 as will be discussed. It is preferable for both components to collapse since the likelihood for the axial force being transmitted to a passenger of the vehicle, arranged adjacent the door, is less.

In variant embodiments, which are not illustrated, the loudspeaker 4 is arranged in other portions of the vehicle, which are generally passenger facing and/or arranged to receive an impact load in the event an exterior of the vehicle is subject to impact.

Referring to FIG. 2A, a loudspeaker 8 comprises: a diaphragm 10, which is displaceable to transmit pressure waves as audible sound and a magnet and voice coil assembly 12, which is operable to convert electrical energy to axial displacement to provide said driving of the diaphragm 10. The loudspeaker further comprises a basket 14 interconnects the diaphragm 10 and magnet and voice coil assembly 12 proving a rigid frame to convey said drive. The basket 14 is connectable to the loudspeaker enclosure 6 for mounting of the loudspeaker 8.

The diaphragm 10 includes a surround 16, which is an elastic portion of material for connection of the diaphragm to the basket 14. A dust cap 17 may be arranged at the centre of the diaphragm to protect the voice coil.

The magnet and voice coil assembly 12 includes a magnet assembly 18, which may comprise one or more permanent magnets 20 arranged around a pole piece 22. The optional pole piece 22 is arranged to concentrate the magnetic field produced by the voice coil. The magnet and voice coil assembly 12 further includes a voice coil assembly 24, which receives electrical energy from an electrical energy source to displace the diaphragm 10. The voice coil may be wound onto an optional former 25. An optional spider 27 may hole the voice coil on place with respect to the diaphragm.

Referring to FIG. 2B an alternative loudspeaker 8 configuration is provided with like reference numbers indicating like parts. In this embodiment, the magnet assembly 18 is alternatively comprises part 20a that extends around a periphery of the voice coil 24 and part 20b arranged within the voice coil 24.

Referring to FIG. 3, the basket 14 comprises a diaphragm support 26 arranged at a first end of the basket, the diaphragm support 26 adapted to support the loudspeaker diaphragm 10 and to connect to a loudspeaker enclosure 6. The diaphragm support 26 may comprise a flanged portion for connection via adhesive, or other means, to the surround 16 of the diaphragm 10. The diaphragm may be adapted (e.g. by a plurality of holes) to receive fixtures, e.g. threaded connector such as a bolt or similar or a pin e.g. a rivet or a split pin or similar, for connection to the loudspeaker enclosure 6.

The basket 14 comprises a magnet and voice coil assembly support 28 arranged at a second end of the basket adapted to support the magnet and voice coil assembly 12, (including just the magnet assembly 18 thereof, hence herein the magnet and voice coil assembly support 28 may be referred to as a magnet assembly support 28). The magnet and voice coil assembly support 28 may comprise a flanged portion for connection via adhesive, or other means, to the support the magnet and voice coil assembly 12, e.g. to the 20 permanent magnet or another component of the magnet and voice coil assembly 12.

The basket comprises a one or more collapsible member(s) 30, e.g. any number between 2 to 20, which extending axially between the a diaphragm support 26 and the a magnet and voice coil support 28, wherein the collapsible members 30 are configured to collapse in an axial direction when the diaphragm support and magnet and voice coil support are subject of a compressive load F in the axial direction. The axial direction is to be defined as a direction parallel to an axis 32, which extends through a rotational axis of symmetry of the diaphragm 10 and magnet and voice coils assembly 12 and from the latter to the former (referred to as a first direction).

Herein, the first direction may be defined as direction in which the magnet and voice coil assemblies are configured to move the diaphragm, when the loudspeaker system is in use.

The compressive load F at which said collapsible members collapse (i.e. the load for the assembly of all the said members as opposed to a single member in an assembly comprising multiple members) is selected to be greater than a predetermined threshold. Said threshold may be with in an envelope from greater than 100 N to less than 2000 or 1000 or 500 N.

The collapsible members 30 include a collapsible portion 34, which may be referred to as a weakening, configured to collapse at said threshold. The collapsible portion 34 may extend the length of the collapsible member 30 or be arranged at one or more positions along its length. Moreover, in the embodiments, whilst the collapsible member is said to collapse under the threshold loading conditions, other portions of the collapsible member are not precluded from collapsing.

The collapsible portion 34 may be formed of a material and/or with geometry adapted to collapse at said threshold. For example, it may take any suitable shape of form but be made of rubber (e.g. an elastically deformable material), or plastic or a low strength alloy (e.g. a plastically deformable material) or other like material, which provides a configuration for collapsing at the threshold.

The collapsible member 30 is configured to collapse when the basked is subject to said loading conditions to decrease an axial distance between the magnet and voice coil assembly support 28 and the diaphragm support 26.

Figure 4A:
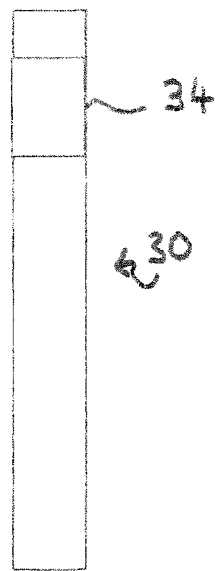
FIGS. 4A to 4C are illustrative plan views of embodiment collapsible members for implementation on the basket of FIG. 3.
Figure 4B:
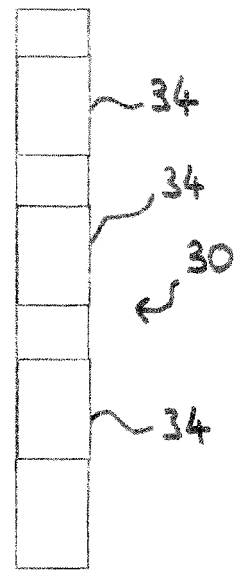
Figure 4C:
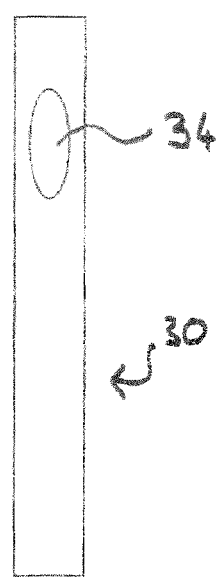

Examples are provided in FIGS. 4A to 4C, wherein:

FIG. 4A illustrates a collapsible member 30 with a single collapsible portion 34, which is formed of a material to introduce a weakening, e.g. with a lower Young's modulus, such as rubber or plastic, than for the remainder of the collapsible member, which may be an alloy.

FIG. 4B illustrates a collapsible member 30 with a multiple collapsible portions 34, which are configured as described for the embodiment associated with FIG. 4A.

FIG. 4C illustrates a collapsible member 30 with a collapsible portion 34 comprising an opening arranged along the length of said member.

Figure 5:
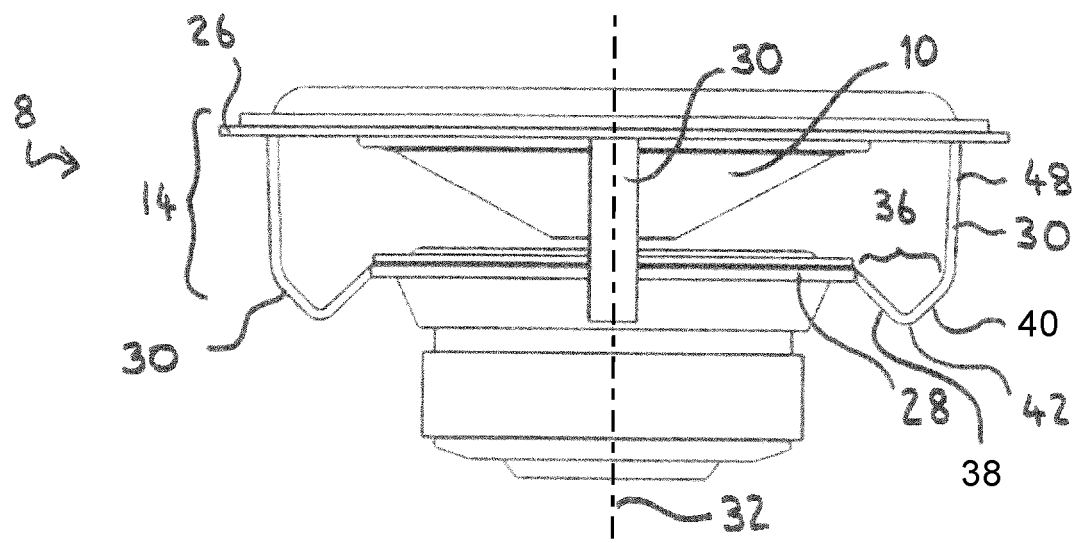
FIGS. 5 to 6 are various views showing embodiment loudspeakers for implementation in the loudspeaker system of FIG. 1.
Figure 6:
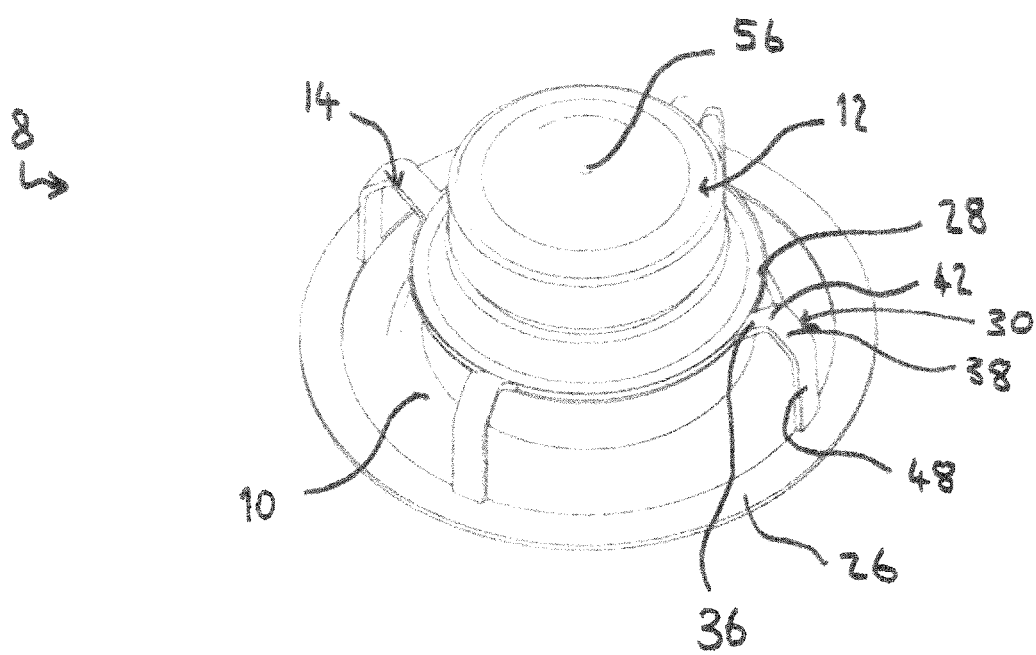
Figure 7:
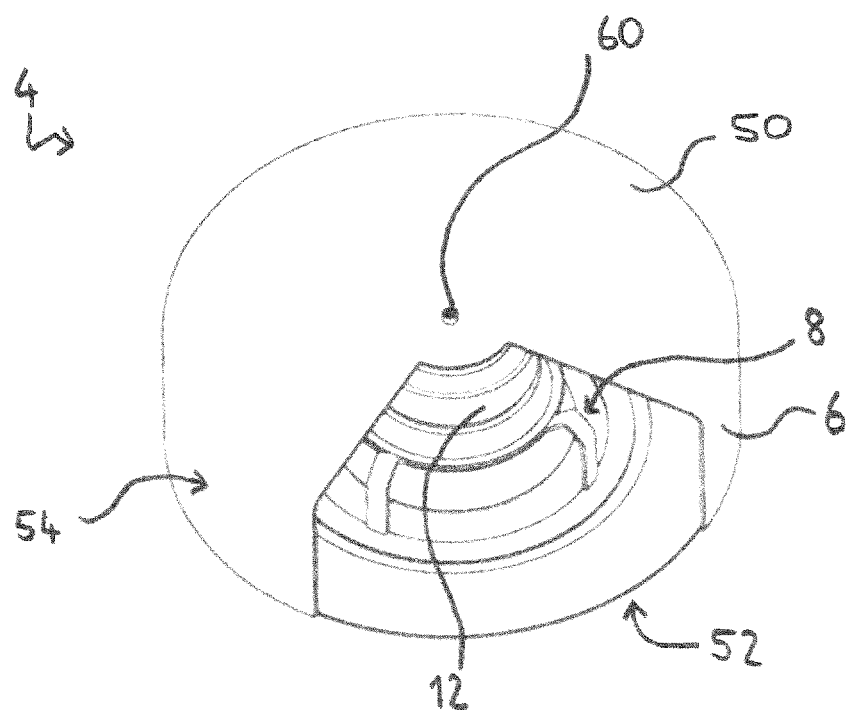
FIG. 7 is a perspective view of the loudspeaker of FIGS. 5 and 6 arranged in a loudspeaker enclosure.

Referring to FIGS. 5 to 7, wherein like reference numerals are used to designate like parts, the collapsible member 30 includes a collapsible portion 34 with an opening 36 arranged to deform, e.g. close or open or otherwise change in geometry, when the basket 14 is subject to said compressive load. Said openings introduce a weakening for selectively collapsing at a particular load however they provide sufficient rigidity under normal conditions so as not to effect sound of a loudspeaker. Whilst in the illustrated embodiment there are four collapsible members, it will be understood that any suitable number may be implemented, e.g. 2, 3, 5, 6 or other number.

In particular, an opening 36 is formed by a first portion 38 and a second portion 40, which are interconnected, and inclined to each other and adjoin at an apex 42. The two portions 38, 40 may be interconnected along a fold line. The opening 36 is arranged to extend substantially in a radial direction with respect to axis 32. The first portion 38 is arranged to extend directly from the magnet and voice coil support 28 in a second direction (which is opposed to the first direction extending axially along the axis 32 from the magnet and voice coil support 28 to the diaphragm support 26) and radially outward. The second portion 40 extends from the first portion 38 in the first direction and radially outward to axially overlap at least part of the first portion.

Herein, the second direction may be defined as a direction which is transverse to a direction in which the magnet and voice coil assemblies are configured to move the diaphragm (i.e. transverse to the first direction), when the loudspeaker is in use.

The collapsible member 30 includes a third portion 48 to extend from the second portion 40, the third portion connected to the diaphragm support 26. The third portion 48 may extend axially and inclined to the axial direction, such that it tapers radially outwardly to the diaphragm support 26 with respect to axis 32.

The magnet and voice coil support 28 is adapted to support the magnet and voice coil assembly on an exterior face 44 thereof that faces away from the diaphragm support 26 and the collapsible member 30 is arranged to partially overlap in the axial direction the supported magnet and voice coil assembly 12.

In an embodiment, which is not illustrated, the opening 36 is alternatively arranged. For example, it may face away from the diaphragm support 26. With such an example, first portion 38 is arranged to extend directly from the magnet and voice coil support 28 in the first direction and a second portion 40, is interconnected to the first portion 38 and adjoin at an apex 42. A third portion 48 extends from the second portion 40, the third portion connected to the diaphragm support 26. Thus in this example the opening 36 is inverted in comparison to the example shown in FIGS. 5 to 8.

Referring to FIG. 7, the loudspeaker 8 is arranged in the loudspeaker enclosure 6 to provide a loudspeaker system. The magnet assembly 12 and a back face 50 of the loudspeaker enclosure 6 are adapted for being mechanically coupled to each other, so as to provide a rigid attachment between the magnet assembly 12 and the enclosure 6, preferably such that the magnet assembly 12 is remains attached to (and thus retained within) the enclosure 6 in the event of a load being applied to the loudspeaker system which causes the loudspeaker system to collapse. In particular, the magnet and voice coil assembly 12 includes a hole 56 arranged on axis 32 for receiving a bolt 58 through a corresponding hole 60 of the back face 50. The bolt 58 and hole 56 are adapted for threaded connection, so as to provide the rigid attachment.

In embodiments, which are not illustrated, alternative mechanical connection configurations may be implemented so as to provide the rigid attachment between the magnet assembly 12 and the enclosure 6, for example: any threaded connector, such as a bolt or screw or similar may be implemented, the threaded connector may be integrated on the magnet and voice coil assembly and extend through the hole in the enclosure for receiving a nut; a pin be integrated on the magnet and voice coil assembly and extend through the hole in the enclosure for receiving a corresponding pin, or for securing by mechanical deformation; an adhesive strip may be arranged between the magnet and voice coil assembly and the back face; the connection may be to a side face of the enclosure, e.g. via a bracket. Alternatively glue may be used. Moreover, the connection can be arranged in any suitable location, e.g. FIG. 7 illustrates the threaded connection arranged aligned with a central axis of the magnet, the connection may also be arranged be about said central axis or a combination thereof.

Figure 8:
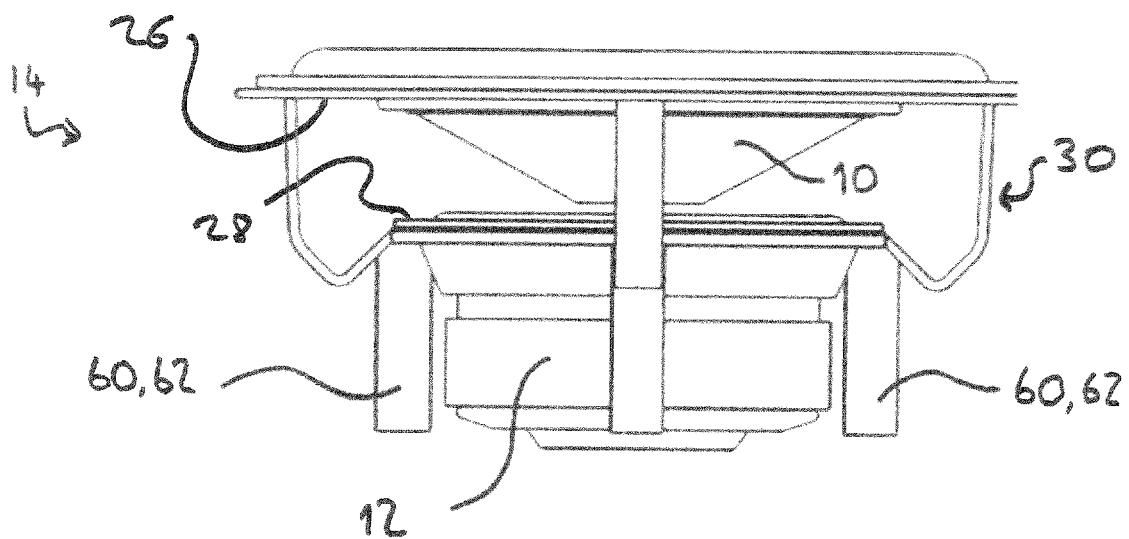
FIGS. 8 to 9 are various views showing embodiment loudspeakers for implementation in the loudspeaker system of FIG. 1.
Figure 9A:
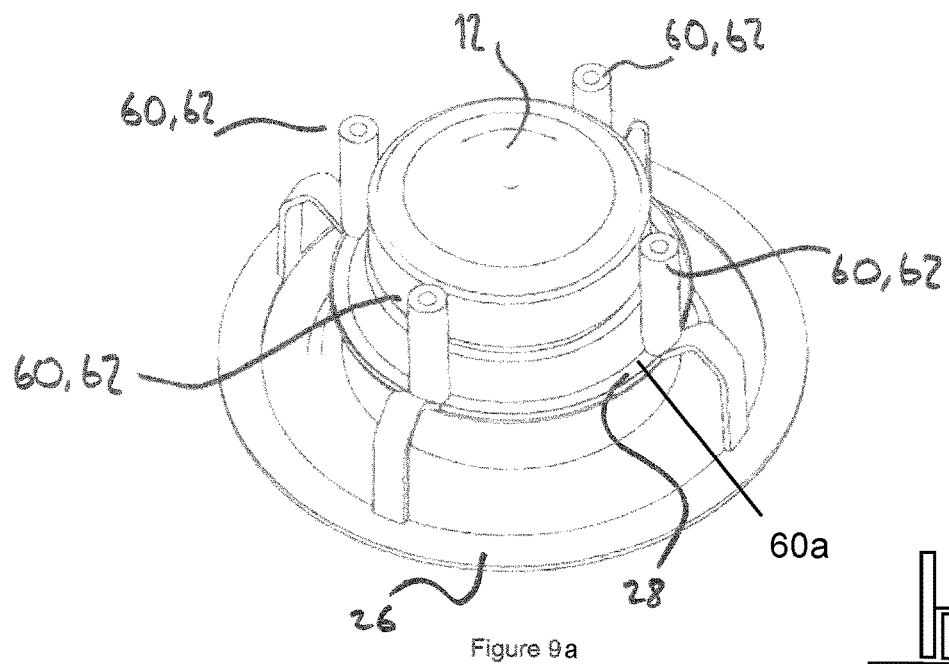
Figure 9B:
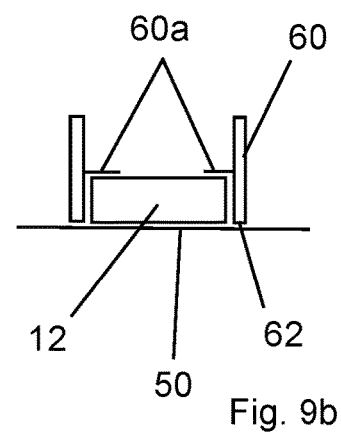
Figure 10:
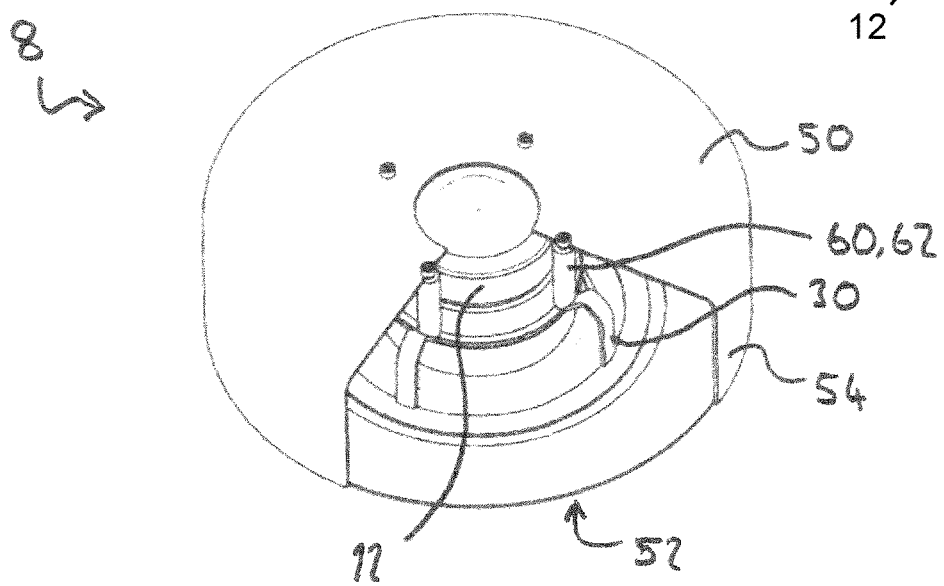
FIG. 10 is a perspective view of the loudspeaker of FIGS. 8 and 9 arranged in a loudspeaker enclosure.

Referring to FIGS. 8 to 10, a variant of the prior embodiment shows the magnet and voice coil assembly support 28 with mounting members 60 at least partially extending therefrom. In this example, there are four mounting members 60, each of which comprise collar 62 (here the collar 62 is the top of the mounting members 60, as depicted in FIG. 9). The collar 62 extends (i.e. has a thickness which extends) in the second direction to provide a mounting surface which abuts the back face 50 of the enclosure 6.

The collar 62 of each of the mounting members 60 provides a hole, which permits the mounting members 60 to be rigidly attached to the back face 50 of the enclosure 6, in this example via screws which threadably engage with the holes in the mounting members 60 and corresponding holes in the back face 50 of the enclosure 6. The collar 62 extends so as to overlap in the axial direction (first direction) the magnet assembly 12.

The mounting members 60 are rigidly connected to a flange 60a (in this example about midway along the length of the mounting members). The flange 60a overlaps the magnet assembly 12 in the second direction, and is rigidly attached to the back face 50 of the enclosure 6, via the mounting members. Thus, the flange (indirectly) provides a rigid attachment between the magnet assembly 12 and the back face 50 of the enclosure 6, via the mounting members 60, by retaining the magnet assembly 12 in position with respect to the back face 50 of the enclosure 6.

The flange 60a is shown schematically in FIG. 9b, with the back face 50 of the loudspeaker enclosure 6 shown only in part in this drawing.

The connection of the mounting members 60 to a back face 50 of the enclosure 6 (as will be discussed) can additionally/alternatively be implemented according to any of the various examples described for the prior embodiment shown in FIG. 7, which concerned connection between the back face and the magnet and voice coil assembly.

In embodiments, which are not illustrated, the/each mounting member 60 may extend entirely from the magnet and voice coil support 28 or the collapsible member 30. There may be any suitable number of mounting members, e.g. 1, 2, 3, 5, 6 or other number. The mounting member may extend laterally for engagement with the side face of the loudspeaker enclosure. In such an example, any of the previously described connection configurations may be implemented.

Figure 11:
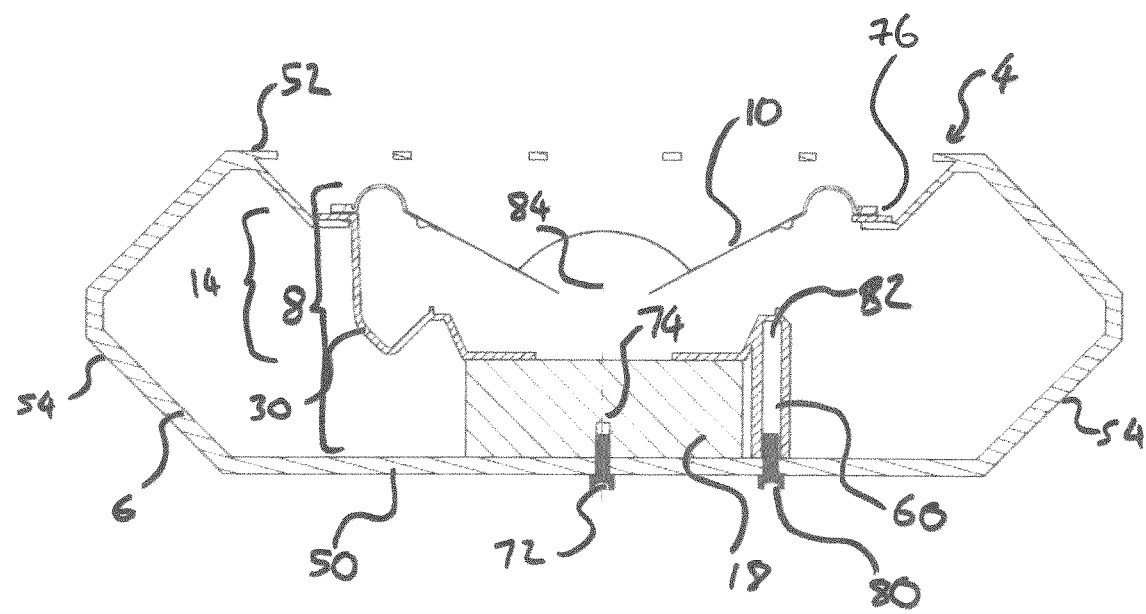
FIGS. 11 and 12 are side cross-sectional views showing embodiment implementations of the loudspeaker system of FIG. 1.
Figure 12:
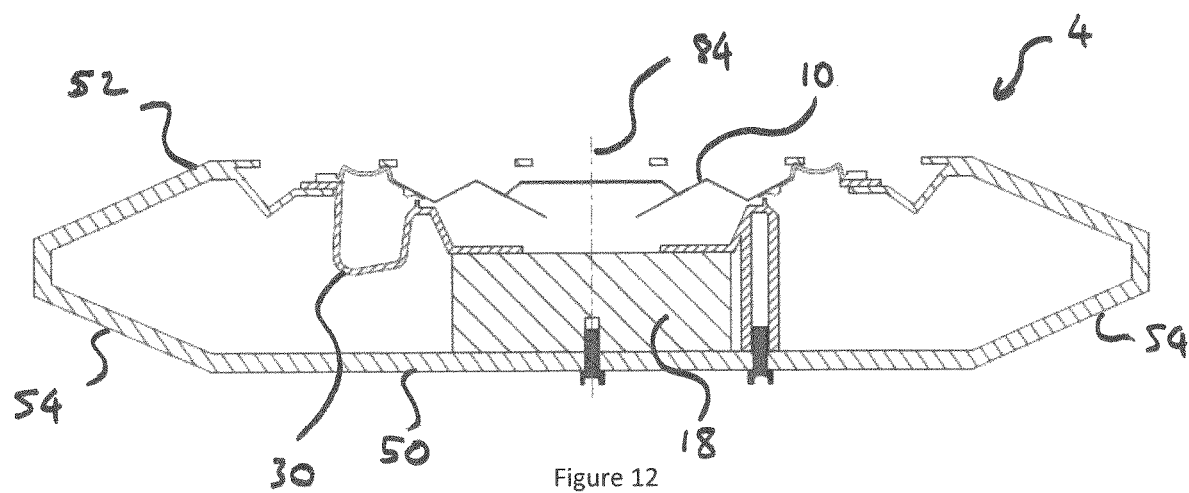

Referring to FIGS. 11 and 12, the illustrated embodiment may include any feature of the other embodiments disclosed herein, the collapsible member 30 includes collapsible portions 34 arranged as openings 36 that extend in the axial direction.

In particular referring initially to FIG. 11, which shows the collapsible portions 34 in a non-collapsed state, the opening 36 of collapsible portion 34A is formed by a first portion 38 and a second portion 40, which are interconnected, and inclined to each other and adjoin at an apex 42. The two portions may be interconnected along a fold line.

The opening 36 is arranged to extend substantially in an axial direction with respect to axis 32. The first portion 38 is arranged to extend directly from the magnet and voice coil support 28 in the first direction and radially outward. The second portion to extend from the first portion in the first direction and radially outward to axially overlap in the radial direction at least part of the first portion.

Referring to FIG. 12, the collapsible portions 34 are shown in a collapsed state, wherein the first portion 38 and second portion 40 have displaced axially from the uncollapsed stated to close opening 36. In particular, said portions are arranged contiguous each other.

In embodiments, which are not illustrated, each collapsible member 30 can include one or more of said collapsible portions (there are two provided in said figure). Moreover, a collapsible portion may not be arranged immediately adjacent the magnet and voice coil support 28.

In embodiments, which are not illustrated, the basket 14 is configured with the magnet and voice coil support 28 adapted to support the magnet and voice coil assembly on an interior face thereof that faces from the diaphragm support 26. It will be understood that all of the collapsible members as described herein may be implemented with such a basket configuration.

Referring to FIG. 11, a loudspeaker system 4 comprises the embodiment loudspeaker 8 shown arranged in enclosure 6. The magnet assembly 18 is rigidly attached (and thus connected) to the back face 50 of the enclosure 6 by means of a connector implemented as a bolt 72 threadably engaged with hole 74 in the magnet assembly 18 and a corresponding hole in the back face 50. The diaphragm support 26 of the basket 14 are connected to a front face 52 of the enclosure 6 by means of an adhesive connection 76. In embodiments. The mounting members 60 are connected to the back face 50 of the enclosure 6 by means of a connector implemented as a bolt 80 threadably engaged with hole 82 in the magnet assembly 18 and back face 50. In variant embodiments, which are not illustrated, other connection configurations may be implemented, for any of the connections in the preceding paragraph, e.g.: the connector can be arranged as a screw, rod or pin; both holes may be absent a thread with the thread alternatively implemented on a nut; an adhesive connection may be implemented by an adhesive strip.

Referring to FIG. 12, the loudspeaker system 4 of FIG. 11 is illustrated in a collapsed state. In particular, side faces 54 interconnecting the back face 50 and front face 52 have collapsed such that the separation between the back face 50 and front face 52 along axis 84 is reduced. In a similar manner the collapsible member(s) 30 of the basket 14 have collapsed (by means of buckling) such that the separation between the magnet assembly 18 and diaphragm 10 along axis 84 is reduced. The magnet assembly 18 thus remains attached to the back face 50 of the loudspeaker enclosure 6 (e.g. even in the event of a load being applied to the loudspeaker system which causes the loudspeaker system to collapse), enabling controlled collapsing and retention of heavy components of the loudspeaker 8 within the enclosure 6.

In variant embodiments, which are not illustrated, the basket does not comprise mounting members 60, e.g. the magnet assembly 18 could be rigidly attached to the enclosure 6 by one or more physical connectors (e.g. one or more screws threadably attaching the magnet assembly 18 to the enclosure 6), without involving any mounting members 60. In embodiments, the magnet support 28 is arranged behind the magnet assembly 18.

Figure 13:
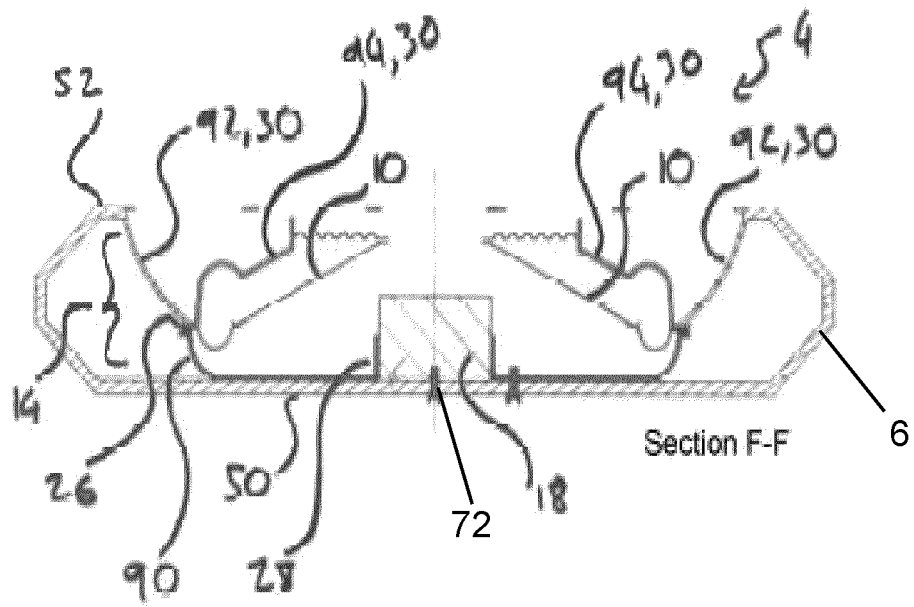
FIGS. 13 and 14 are side cross-sectional views showing embodiment implementations of the loudspeaker system of FIG. 1.
Figure 14:
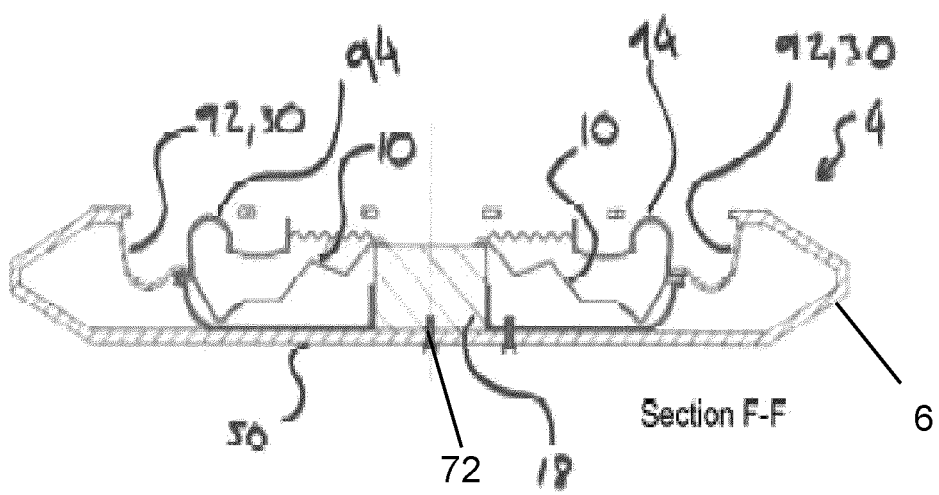

Referring to FIGS. 13 and 14, a loudspeaker system 4 with an inverted driver configuration is shown. Again, the magnet assembly 18 is rigidly attached to an enclosure by a physical connector 72, such as a screw. In this embodiment, the diaphragm 10 is arranged to the emit audible sound towards the front face 52, and the basket 14 includes the magnet assembly support 28, and a diaphragm support 26, which are interconnected by first axial members 90. Second axial members 92 extend from diaphragm support 26 to the front face 52. Third axial members 94 extend from the diaphragm support 26 for support of the spider 27, and include perforations (not illustrated) for transmission of the audible sound therethrough. Referring to FIG. 14, the second axial members 92 and the third axial members 94 are collapsible as collapsible members 30.

In variant embodiments, one or more of the: first axial members 90; second axial members 92; third axial members 94, are configured as collapsible members.

Figure 15:
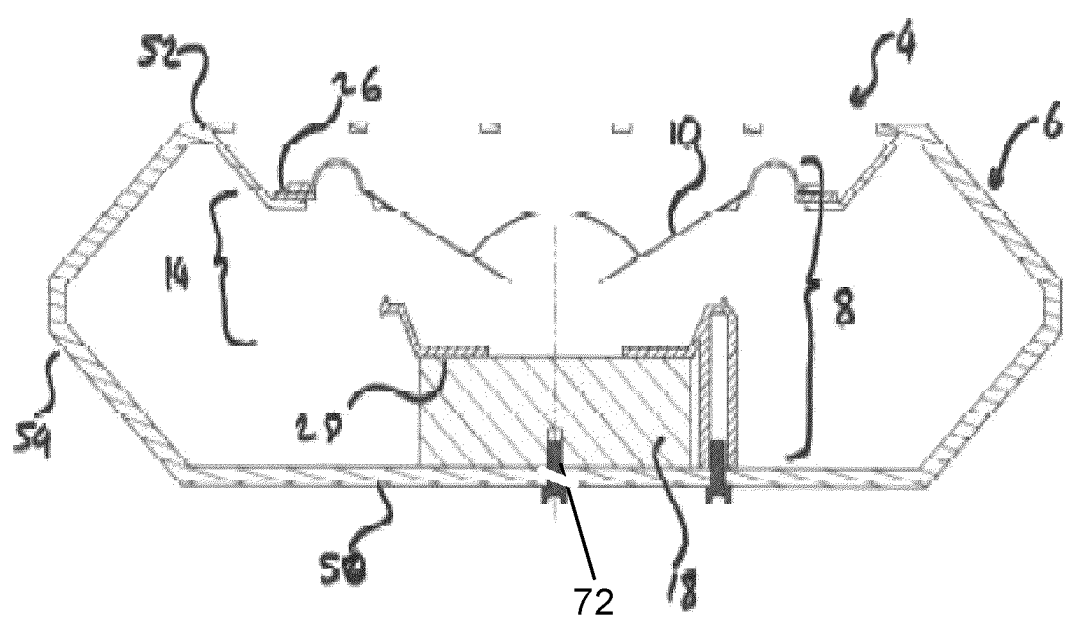
FIG. 15 is a side cross-sectional views showing embodiment implementations of the loudspeaker system of FIG. 1.

Referring to FIG. 15, a loudspeaker system 4 corresponding to the embodiment of FIGS. 11 and 12 is shown. Again, the magnet assembly 18 is rigidly attached to an enclosure 6 by a physical connector 72, such as a screw. In this embodiment, removable members (not shown) forming the axially extending portions of the basket 14, which interconnect the magnet assembly support 28, and a diaphragm support 26 are removably attached to said supports.

The removable attachment of the removable members includes various implementations, e.g.: a threaded connector can be arranged as a screw or bold an nut; rod or pin; an adhesive connection configured to break upon the application of a user applied threshold force may be implemented by an adhesive strip arranged between an overlapping corresponding in shape portions of the member and the diaphragm support or magnet and voice coil assembly.

Referring to FIG. 15, a method of assembling a loudspeaker system 4 includes arranging the loudspeaker 8 in the loudspeaker enclosure 6. With the diaphragm 10 and magnet assembly 18 and voice coil assembly (not shown) held in operative alignment by the basket 14, the diaphragm is connected to the front face 52 of the enclosure 6 and the magnet assembly 18 is rigidly attached and thus connected to the back face 50 by the physical connector 72 (the magnet assembly 18 could alternatively or additionally be connected to the side face 54, though this is not shown). Subsequently, with the diaphragm 10 and magnet assembly 18 now held in operative alignment by their connections to the loudspeaker enclosure 6, the removable members (not shown) are removed as shown in FIG. 15.

In variant embodiments, which are not illustrated, a variant of the directly preceding embodiment comprises the inverted driver configuration of FIGS. 14 and 15 implemented with the first axial members 90 as removable.

In embodiments, which are not illustrated, the diaphragm and magnet and voice coil assembly are each individually connected to the loudspeaker enclosure without implementing the basket to act as an intermediary guide to ensure they are arranged correctly with respect to each other. In such an embodiment the diaphragm and magnet and voice coil assembly are operatively aligned as part of their connection to the enclosure.

In the all embodiments, the enclosure 6 comprises a walled structure. Typically it is formed of 1 to 4 mm or 1.8-3 mm, thick material. The enclosure may be implemented with a ranged of materials, which may be: plastic based, including, Polypropylene, Acrylonitrile Butadiene Styrene, Polycarbonate; fibre reinforced, e.g. Glass Fibre Reinforced Polymer; metal, e.g. an alloy; a combination thereof.

The side face 54 of the enclosure 6 may be configured to encourage buckling, e.g. geometrically configured and/or configured with points of weakening. Referring to FIG. 12 and example of said geometric weakening includes the side face 54 with a V-shaped section, although other sections are contemplated, such as U-shaped. An example of points of weakening includes a scored portion of reduced thickness.

In embodiments, the loudspeaker system 4 is configured, when subject to a mechanical shock test as defined herein, to have no failure modes. Failure modes as used herein may refer to one or more of: failure of the enclosure; failure of components of the loudspeaker assembly; failure of a connection between components of the loudspeaker assembly and the enclosure. By passing the mechanical shock test, i.e. without any failure modes, it can be ensured that the loudspeaker system is suitable for use in a vehicle as defined herein.

As used herein "mechanical shock test" refers to the application, to a test sample loudspeaker system 4, of 10 half sinusoidal pulses of 500 m/s$^2$ during 6 ms at 20° C. in X, Y and Z directions, wherein the Z direction is in the direction of axis 84 as shown in FIG. 12, and the Y and X directions are perpendicular to the Z direction and to each other. Said pulses are applied in the three directions X, Y and Z on the same test sample loudspeaker system.

The loudspeaker system 4 is mounted to a test platform, which is similar to a real-world application, for example a test platform with the same mounting system and configuration as disclosed for the door in FIG. 1. The loudspeaker system 4 coupled to the test platform is subsequently excited with the aforedescribed loading, which is transmitted to the loudspeaker system 4. In particular, the loudspeaker system 4 coupled to the test platform are accelerated by a drop test from a predefined height and subject to impact with a predefined shock absorbing object, which are configured to ensure the acceleration of 500 m/s$^2$ and the 6 ms duration.

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

The foregoing description of one or more implementations provides illustration and description, but is not intended to be exhaustive or to limit the scope of the invention to the precise form disclosed.

Modifications and variations are possible in light of the above teachings or may be acquired from practice of various implementations of the present disclosure.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

REFERENCES

2 Vehicle door
4 Loudspeaker system
  6 Loudspeaker enclosure
    50 Back face
    52 Front face
    54 Side face
  8 Loudspeaker
    10 Diaphragm
      16 Surround
    12 Magnet and voice coil assembly
      18 Magnet assembly
      20 Permanent magnet
      22 Pole piece
      24 Voice coil assembly
    14 Basket
      26 Diaphragm support
      28 Magnet and voice coil assembly support
      44 Exterior face
      46 Interior face
      30 Collapsible member(s)
      34 Collapsible portion
      36 Opening
      38 First portion
      40 Second portion
      42 Apex
      48 Third portion
      60 Mounting member
      60a Flange
      62 Collar
      64 Removable attachment
      66 First hole
      68 Second hole
      70 Connector
    32 Axis

The invention claimed is:

1. A loudspeaker system comprising:
a loudspeaker assembly including a diaphragm, a magnet assembly, and a voice coil assembly, wherein the magnet assembly and voice coil assembly are drivably coupled to the diaphragm to displace the diaphragm to transmit pressure waves as audible sound,
an enclosure arranged to enclose the loudspeaker assembly and including a back face and a front face,
wherein said back face extends over the magnet assembly, and the magnet assembly is mechanically coupled to the back face and/or side face of the enclosure and the diaphragm is coupled to a front face of the enclosure,
wherein the magnet assembly and diaphragm are directly connected to each other by a collapsible basket or said loud speaker assembly does not comprise a basket coupling the magnet assembly and diaphragm.

2. The loudspeaker system of claim 1, wherein the front face of the enclosure comprises an aperture corresponding to the diaphragm for transmission of the audible sound to a user.

3. The loudspeaker system of claim 1, wherein the mechanical coupling between the magnet assembly and the back face and/or side face of the enclosure provides a rigid attachment between the magnet assembly and the enclosure.

4. The loudspeaker system of claim 1, wherein the mechanical coupling between the magnet assembly and the back face and/or side face of the enclosure provides a rigid attachment between the magnet assembly and the enclosure such that the magnet assembly remains attached to and/or retained within the enclosure in the event of a load being applied to the loudspeaker system which causes the loudspeaker system to collapse.

5. The loudspeaker system of claim 1, wherein the mechanical coupling between the magnet assembly and the back face and/or side face of the enclosure is provided by one or more physical connectors, wherein the/each physical connector engages with both the magnet assembly and the enclosure.

6. The loudspeaker system of claim 1, wherein the mechanical coupling between the magnet assembly and the back face and/or side face of the enclosure is provided by a physical element configured to retain the magnet assembly in position with respect to the back face and/or side face of the enclosure, wherein the physical element is rigidly coupled to the enclosure.

7. The loudspeaker system of claim 1, wherein when subject to a compressive force between the back and front face, the loudspeaker system is configured to collapse at substantially a failure load of the enclosure, wherein said collapsing includes reduction in a distance between the magnet assembly and diaphragm.

8. The loudspeaker system of claim 7, wherein the loudspeaker system is configured to collapse between a range extending from the failure load of the enclosure to less than 30% or 20% more than said failure load of the enclosure.

9. The loudspeaker system of claim 1, wherein, when subject to a compressive force between the back and front face, the loudspeaker system is configured to collapse at failure load that is less than 5000 N or 3000 N or 2000 N or 1000 N.

10. The loudspeaker system of claim 1, wherein, when subject to a compressive force between the back and front face, the loudspeaker system is configured to collapse at failure load that is greater than 500 N.

11. The loudspeaker system of claim 1, wherein the loudspeaker assembly comprising a basket, wherein the basket is configured to collapse at less than the failure load of the enclosure.

12. The loudspeaker system of claim 11, wherein the collapsible basket is configured to collapse at less than 30% or 20% of the failure load of the enclosure.

13. The loudspeaker system of claim 11, wherein the basket is configured to collapse at a failure load that is less than 500 N.

14. The loudspeaker system of claim 11, wherein, wherein the collapsible basket is configured to collapse at a failure load that is greater than 100 N.

15. The loudspeaker system of claim 1, wherein the loudspeaker assembly comprises a basket, the basket including a plurality of axially extending members interconnecting a diaphragm support and the magnet assembly support, said members comprising a weakening section configured to collapse under a compressive load applied between the diaphragm support and a magnet assembly support.

16. The loudspeaker system of claim 1, wherein the loudspeaker assembly comprising a basket, the basket includes a plurality of axially extending members interconnecting a diaphragm support and a magnet assembly support, said members removably attached to the diaphragm support and the magnet assembly support.

17. The loudspeaker system of claim 1, wherein the enclosure comprises a walled structure interconnecting the back face and front face.

18. The loudspeaker system of claim 1, wherein the loudspeaker system is configured to exhibit no failure modes when subject to a mechanical shock test as defined herein.

19. The loudspeaker system of claim 1, wherein the loudspeaker enclosure encloses a volume of 3 litres or more.

20. The loudspeaker system of claim 1, wherein the loudspeaker enclosure is configured to be mounted in a motorized passenger vehicle.

21. A motorized passenger vehicle comprising a loudspeaker system, wherein the loudspeaker system comprises:
    a loudspeaker assembly including a diaphragm, a magnet assembly, and a voice coil assembly, wherein the magnet assembly and voice coil assembly are drivably coupled to the diaphragm to displace the diaphragm to transmit pressure waves as audible sound,
    an enclosure arranged to enclose the loudspeaker assembly and including a back face and a front face,
    wherein said back face extends over the magnet assembly, and the magnet assembly is mechanically coupled to the back face and/or side face of the enclosure and the diaphragm is coupled to a front face of the enclosure, wherein the magnet assembly and diaphragm are directly connected to each other by a collapsible basket or said loud speaker assembly does not comprise a basket coupling the magnet assembly and diaphragm.

22. The motorized passenger vehicle of claim 21, wherein the loudspeaker system is arranged in a door or an undercarriage of said vehicle.

23. A method of assembling a loudspeaker system, the method comprising:
    arranging a diaphragm, a magnet assembly of a loudspeaker assembly within a loudspeaker enclosure;
    connecting the diaphragm to a front face of the enclosure;
    connecting the magnet assembly to a back and/or side face of the enclosure, wherein a back face extends over the magnet assembly,
    wherein the magnet assembly and diaphragm are directly connected to each other by a collapsible basket or said loudspeaker assembly does not comprise said basket.

24. The method of claim 23, wherein the basket including removable members to interconnect the diaphragm and magnet assembly, the method comprising, subsequent to connection of the loudspeaker assembly to the enclosure, removing the removable members.

* * * * *